United States Patent [19]
Birke

[11] 3,778,982
[45] Dec. 18, 1973

[54] SCRUBBER FOR REMOVING PARTICULATE MATTER FROM GASEOUS FLUID

[75] Inventor: Gerhard Birke, Langenberg, Germany

[73] Assignee: Firma W. Ernst Haas & Sohn, Sinn/Dillkreis, Germany

[22] Filed: May 25, 1972

[21] Appl. No.: 256,914

[30] Foreign Application Priority Data
May 28, 1971 Germany.............. P 21 26 594.1

[52] U.S. Cl....................... 55/290, 55/293, 55/302, 55/304
[51] Int. Cl............................ B01d 46/08
[58] Field of Search............... 55/272, 273, 284, 55/291, 292, 294, 302, 304, 305, 283, 285, 286, 287, 288, 290, 293; 210/406, 416, 457, 493

[56] References Cited
UNITED STATES PATENTS

| | | | |
|---|---|---|---|
| 2,732,912 | 1/1956 | Young | 55/290 |
| 2,795,291 | 6/1957 | Pierce | 55/293 X |
| 3,004,276 | 10/1961 | Hoffman | 55/293 |
| 3,008,543 | 11/1961 | Bourdale et al. | 55/304 X |
| 3,343,342 | 9/1967 | Du Rocher | 55/304 X |
| 3,716,968 | 2/1973 | Mischke | 55/294 |

Primary Examiner—Dennis E. Talbert, Jr.
Assistant Examiner—Neil F. Greenblum
Attorney—Michael S. Striker

[57] ABSTRACT

A filter unit is interposed in the flow path of a stream of particle-gaseous fluid and can be rotated about an upright axis. The filter unit has a pair of vertically spaced plates connected by connecting elements about which a web of filter material is trained to surround an interior chamber. The gaseous fluid passes through the filter material into the interior of the chamber from which the now filtered gaseous fluid is withdrawn by a conduit normally in communication with the chamber and also in communication with a suction source. The particulate matter is retained at the exterior side of the web of filter material. The filter unit can be rotated about its upright axis to thereby eject the retained particulate matter by centrifugal force from the web of filter material, and a control arrangement interrupts the communication between the filter chamber and the withdrawal conduit for filtered material in automatic response to rotation of the filter unit, restoring the communication when the rotation terminates.

10 Claims, 6 Drawing Figures

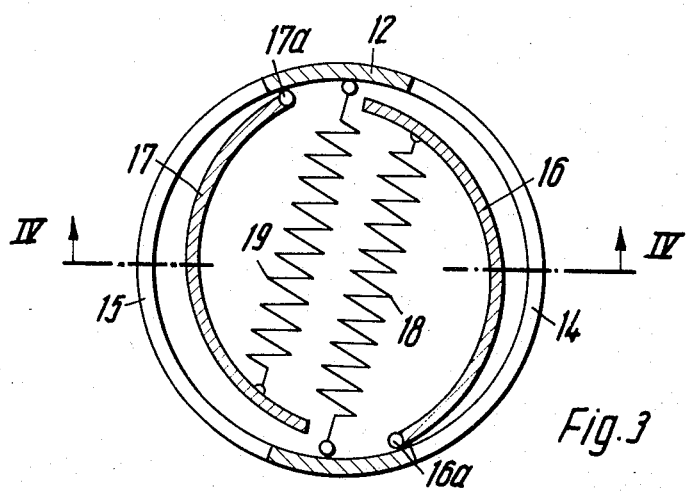
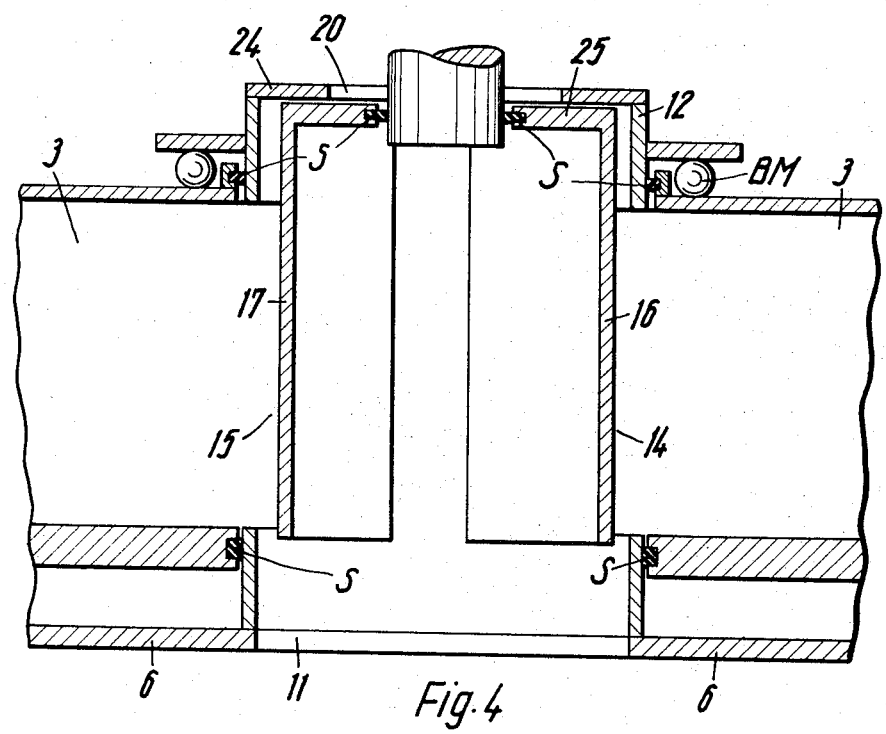

SCRUBBER FOR REMOVING PARTICULATE MATTER FROM GASEOUS FLUID

BACKGROUND OF THE INVENTION

The present invention relates generally to a scrubber, and more particularly to a scrubber for removing particulate matter from gaseous fluid. Still more particularly the invention relates to a scrubber which not only removes particulate matter from gaseous fluid but which can be regenerated, that is which can rid itself of the retained particulate matter.

There are many instances where such scrubbers must be utilized, to remove particulate matter from gaseous fluid, that is air or the like. It is well known to provide in such scrubbers filter media, such as felt or fabrics of natural or synthetic fibers through which the particle-carrying gaseous fluid is made to pass, whereby the particles are entrapped and retained in the fibers of the filter medium whereas the gaseous fluid passes therethrough to emerge at the other side in filtered condition. Such filter media are utilized in form of filter hoses, filter pockets, filter mats or the like.

According to the prior art, where the filter media are of the type which is not discarded but instead is regenerated, that is which has the retained particles removed therefrom and can then be used again, such regeneration is effected by passing clean gaseous fluid through the filter medium in the direction opposite to the normal flow of particle-carrying gaseous fluid. This dislodges the retained particles, an action which in some scrubber constructions is enhanced by imparting to the filter medium suitable vibrations, produced in any one of various known ways, for instance electrically, by the use of compressed air or the like.

Other scrubber units utilize only the flushing action of clean gaseous fluid, that is gaseous fluid which does not carry particles. In this case the clean gaseous fluid must be passed through the filter medium to be regenerated either in a pulsing manner or in shock-like manner, in order to impart to the filter medium a motion—usually a fluttering motion—which aids in the dis-lodging of the retained particles.

Regardless of which type of approach is chosen in the particular prior-art scrubber devices, it is clear that substantial technical expenditures are necessary to obtain the desired regeneration. Thus, the known scrubber units which regenerate their filter medium are expensive to construct and, due to their relative complexity, are also undesirably subjected to malfunction.

SUMMARY OF THE INVENTION

It is, accordingly, a general object of the present invention to overcome the disadvantages of the prior art.

More particularly it is an object of the present invention to provide an improved scrubber for removing particulate matter from gaseous fluid, which is not possessed of the disadvantages of the prior art.

A further object of the invention provides for the provision of a scrubber of the type here under discussion, in which the regeneration of the filter material is substantially simplified without, however, incurring any loss in regeneration effectiveness.

Another object of the invention is to provide such a scrubber which has in a relatively small space a very large filter surface area.

In pursuance of these objects and of others which will become apparent hereafter, the invention resides, in accordance with one embodiment and briefly stated, in a scrubber for removing particulate matter from gaseous fluid which comprises a filter unit interposed in the flow path of a stream of particle-carrying gaseous fluid and mounted for rotation about an upright axis, the filter unit comprises a pair of vertically spaced plates, a plurality of connecting elements connecting the plates, and a web of filter material trained about the connecting elements and surrounding the axis so as to define an interior chamber into which filtered gaseous fluid enters while the particles are retained at the exterior side of the web. Conduit means communicates with a source of suction and normally also communicates with the interior chamber for withdrawing filtered gaseous fluid from the latter. Rotating means is provided for rotating the filter unit about the upright axis to thereby effect centrifugal ejection of retained particles from the web, i.e. to effect regeneration of the web of filter material. Finally, there is also provided control means for interrupting the communication between the interior chamber and the conduit means is automatic response to rotation of the filter unit about the upright axis thereof.

It is advantageous to arrange the web of filter material in such a manner that the interior chamber is of substantially star-shaped cross-sectional outline, in which case it is assured that in a very small space a very large filter surface area can be provided. The points of such a star-shaped configuration have the additional advantage that when the filter unit is rotated about its upright axis, each of the points acts in effect in the same manner as the blades of a fan or of a turbine, facilitating the centrifugal outward ejection of particulate matter which has been entrapped in the material of the web of filter material. An additional advantage of a star-shaped configuration for the interior chamber resides in the fact that in the interior of the chamber there will develop flow of air upon rotation, which causes a good radially outward air circulation through the material of the web, resulting in a proper cleaning and regeneration of the filter material without in many cases requiring the provision of means for introducing a stream of air (for back-flushing purposes) into the chamber. Such normal development of a flow of air moving in the chamber in radially outward direction through the web of filter material results from the centrifugal force originating upon rotation of the novel filter unit.

According to a currently preferred embodiment the filter unit utilizes the aforementioned vertically spaced plates, with the connecting elements being rod-shaped or of similar configuration, and being in part located on an inner circle surrounding the axis of rotation and in part on an outer circle also surrounding the axis of rotation and surrounding the inner circle with radial spacing therefrom. The filter material web is then alternately trained about one of the connecting elements of the outer circle and thereupon about one of the connecting elements of the inner circle, followed by training about a connecting element of the outer circle and so on, whereby the star-shaped cross-sectional configuration desired for the inner chamber is obtained. Thus, a very large filter material surface area can be located in a very small space.

An electrical or electro-mechanical drive can be provided for rotating the filter unit about its upright axis and the upper of the two plates is advantageously provided with an aperture communicating with a conduit which is in connection with a source of suction, for instance with the suction side of a ventilator. The connection between the aperture and the conduit is established in accordance with an advantageous embodiment by providing a tubular conduit section which is turnable with the upper plate and in communication with the aperture thereof, having two openings which communicate with the conduit means and which can both be closed by segmental closure elements which are pivotably mounted and which are normally urged to open position but can move to closed position against the urging of the biasing means provided for holding them in open position, in response to centrifugal force developing when the filter unit is rotated about its upright axis. A third opening can also be provided in the tubular conduit section, being normally closed and opening when the filter unit rotates about its uprigt axis to admit back flushing air.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawing.

BRIEF DESCRIPTION OF THE DRAWING

FIG. 3 is a section taken on line III—III of FIG. 1 with portions omitted for the sake of clarity;

FIG. 4 is a section taken on line IV—IV of FIG. 3, again with portions omitted for the sake of clarity;

DESCRIPTION OF THE PREFERRED EMBODIMENTS

Figure 1:
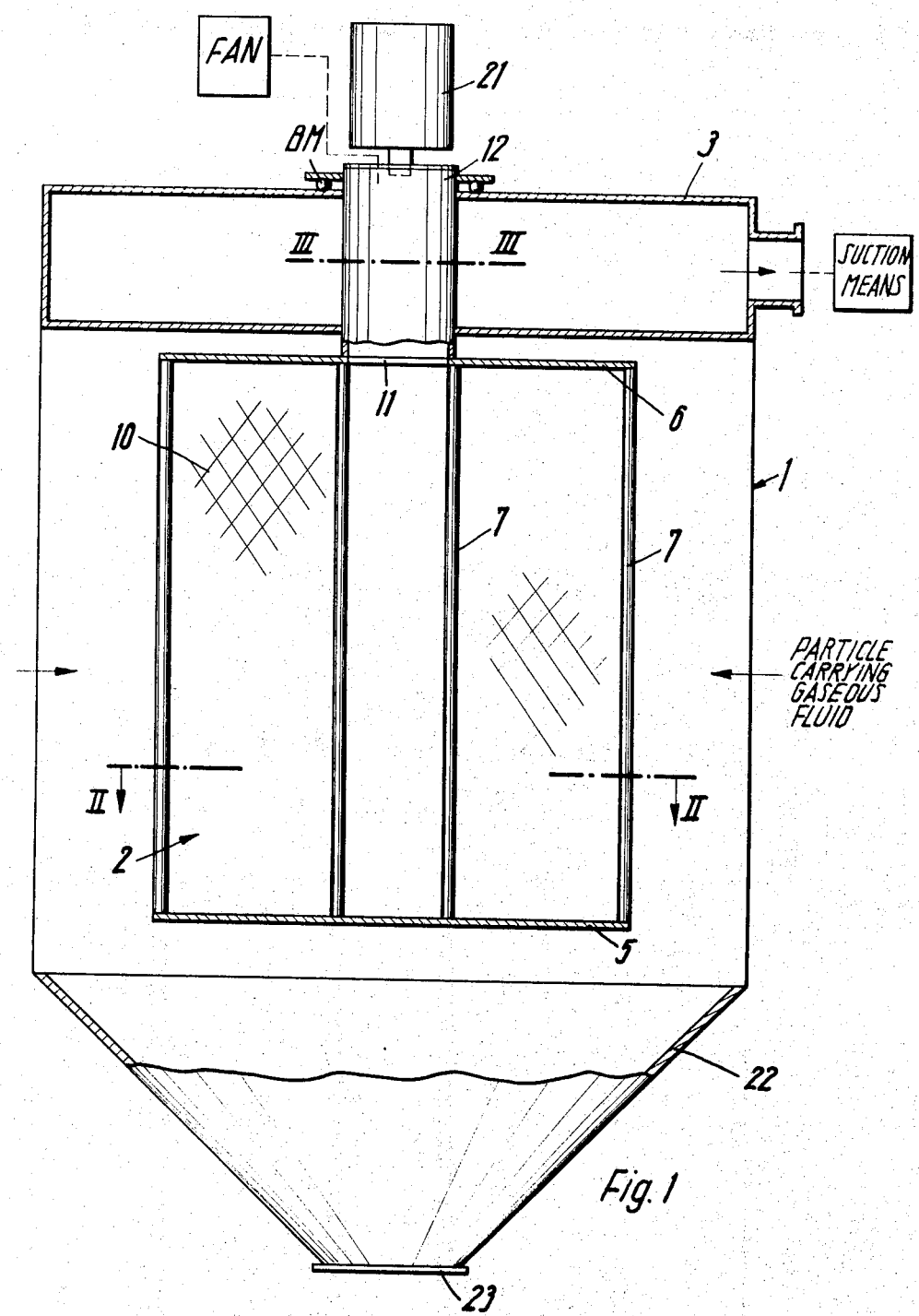
FIG. 1 is a diagrammatic fragmentary vertical section through a scrubber embodying the present invention.

Discussing the drawings in detail it will be seen that in the exemplary illustrated embodiment of FIGS. 1–6 the scrubber per se is designated with reference numeral 1. Such components as are not essential for an understanding of the invention have been omitted for the sake of clarity of illustration.

Figure 2:
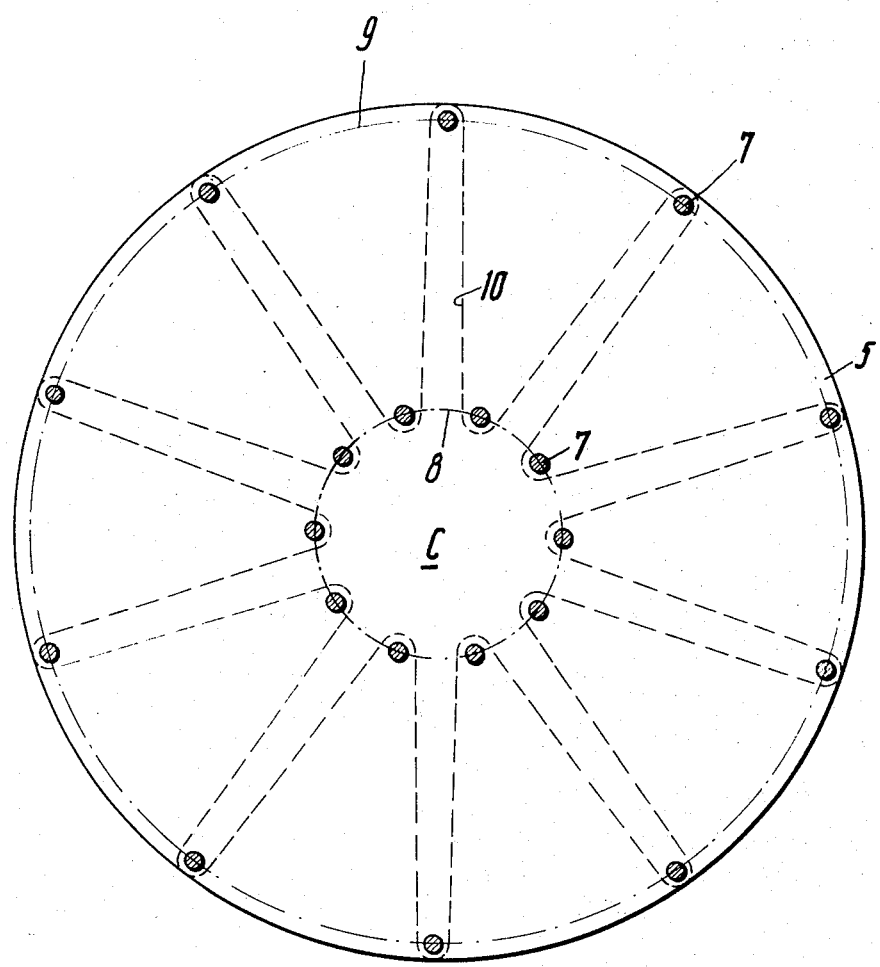
FIG. 2 is a section taken on line II—II of FIG. 1.

The filter unit provided in the scrubber according to the invention is designated with reference numeral 2 and is rotatable about an upright axis, for instance by the diagrammatically shown rotating means 21. The filter unit 2 utilizes two vertically spaced plates 5 and 6 which are connected by connecting elements 7, here illustrated as rod-like connecting elements which, as is most clearly evident by a comparison of FIGS. 1 and 2, are arranged so that some of them are located on an inner circle surrounding the axis of rotation and the others are located on an outer circle also surrounding the axis of rotation as well as the inner circle. The inner circle is identified with reference numeral 8 in FIG. 2, and the outer circle with reference numeral 9. In the illustrated embodiment a web 10 of filter material of any suitable type is trained about the connecting elements, in such a manner as to obtain an interior chamber C of substantially star-shaped cross-shaped cross-sectional outline. For this purpose the web 10 is alternately trained about one of the connecting elements 7 located on the outer circle 9 and then about one of the connecting elements 7 located on the inner circle 8, to be turned and trained about another element 7 on the outer circle 9, and so forth. It is fluid-tightly connected with the plates 5 and 6 in suitable manner which does not form a part of the invention, being known per se.

One of the plates, in the illustrated embodiment the upper plate 6, is provided with an aperture 11 communicating with a tubular conduit section 12 which is fast and rotatable with the upper plate 6 and thereby the entire filter unit. A conduit means 3 is provided which communicates with the diagrammatically illustrated suction means (see FIG. 1), for instance the suction side of a ventilator or the like, which is provided for drawing filtered gaseous fluid from the interior of the chamber C. In the illustrated embodiment the filter unit 2 is mounted for rotation about its upright axis whereby the rotating means 21 which has already been mentioned (and which may be an electro-motor or the like). The details of the mounting have not been shown, except to diagrammatically indicate bearing means BM provided for this purpose.

The tubular conduit section 12 is provided with three openings (compare FIG. 4) which are identified with reference numerals 14, 15 and 20. The openings 14 and 15 communicate normally with the interior of the conduit means 3. Located in the inside of the conduit section 12 are two segmental closure elements 16 and 17 (see FIG. 3) which are provided with right-angled arm portions 24 and 25, respectively (see FIG. 4) and are--. associated with the openings 14 and 15, respectively. The closure element 16 is pivoted at 16a, and the element 17 at 17a so that they can move between the open position illustrated in FIG. 3 and the closed position in which they completely overlie and close the respective openings 14 and 15. As also shown in FIG. 3, the closure elements 16 and 17 are normally urged to the illustrated open position by biasing means, here shown in form of helical contraction springs 18 and 19 which are each connected at one end with the tubular conduit section 12 and at the other end with the respective closure elements 16 and 16 at a location spaced from the respective pivots 16a and 17a thereof.

Figure 5:
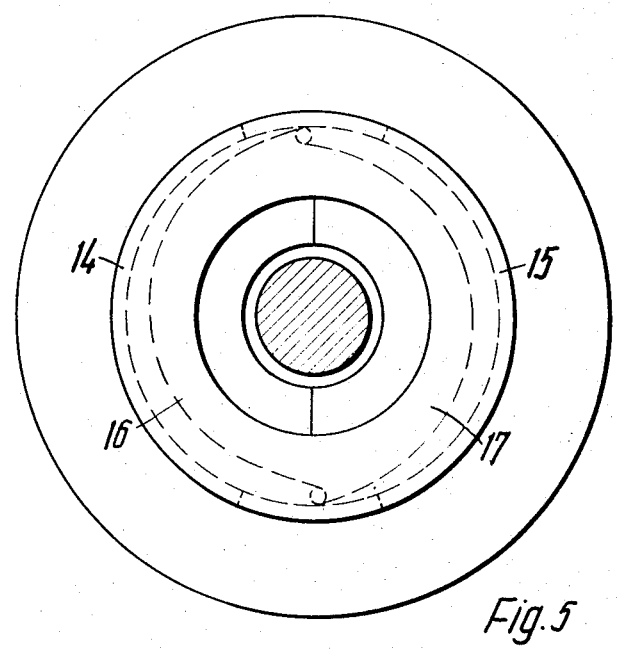
FIG. 5 is a section taken on line V—V of FIG. 1.

When the filter unit 2 is rotated about its upright axis, which is possible because it is turnable independently of and with reference to the conduit means 3 which is sealed relative to the outside of the tubular conduit section 12 by the sealing means S diagrammatically illustrated in FIG. 4 and permitting rotation of the filter unit 2 relative to the conduit means 3, the resultant centrifugal force overcomes the biasing action of springs 18 and 19, urging the closure elements 16 and 17 to closed position in which they close the openings 14 and 15. Communication between the chamber C and the interior of the conduit means 3 is thus interrupted. This is shown in FIG. 5.

Figure 6:
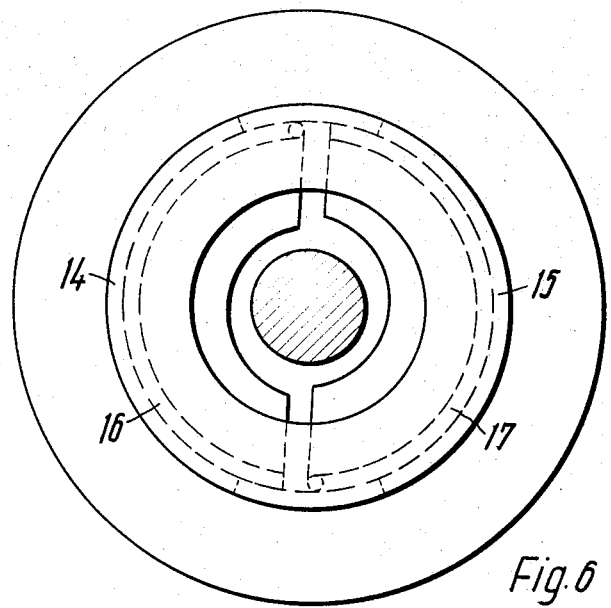
FIG. 6 is a sectional view similar to that in FIG. 5, but illustrating a different operating position.

At the same time, the opening 20 in the tubular conduit section 12—which is normally closed—is opened, for instance controlled by the movement of the closure elements 16 and 17 to close position (i.e. by retraction of the arm portions 24, 25 which until now have extended across 17)., or by the pressure exerted by one or both of the closure elements during such movement to closed position, and permits the entry of back-flushing air into the chamber C from which it is centrifugally ejected through the web 10 of filter material, thereby dislodging the particles which have become retained therein. This operative position is shown in FIG. 6. If desired, a fan 21 (diagrammatically illustrated in FIG. 1) can be provided which forcibly introduces such back-flushing air into the opening 20.

The direction of the incoming particle-carrying gaseous fluid is indicated by the arrows in FIG. 1, and of course normally when the unit 2 is stationary the fluid will enter under pressure inwardly through the web 10, with the particles being retained by the web 10 and with the filtered gaseous fluid being withdrawn from the chamber C via the conduit means 3. When, in response to centrifugal ejection and back-flushing, the particles are dislodged at the exterior side of the web 10, they will fall into the lower downwardly convergent dust-collecting hopper 22 of the device 1, to leave through the outlet 23. Of course the outlet 23 can be provided with a closure, and the particles can be allowed to accumulate in the hopper 22 and be removed periodically when the outlet 23 is open, or alternatively when the outlet 23 can be permanently opened and the particles can be allowed to fall out of the hopper 22 whenever they enter upon being ejected from the web 10.

The operation of the disclosed device will already be clear. Summing it up, however, it is pointed out that during the filtering stage of the operation, the particle-carrying gaseous fluid enters in the direction of the arrows in FIG. 1 from the exterior through the web 10, with the particles being retained by the latter, and with the filtered gaseous material being withdrawn from the chamber C via the aperture 11 and the openings 14 and 15 into the conduit means 3 under the action of the suction means. At this time the openings 14 and 15 are unblocked because the elements 16 and 17 are retained in open position by the action of the springs 18 and 19. The opening 20 is closed.

When the web 10 is to be regenerated, that is when it is to be freed of the accumulated retained particles, the rotating means 21 is utilized to impart rotation to the filter unit 2. The resulting centrifugal force causes the particles entrapped at the exterior side of the web 10 to be flung off, and the air or other gaseous fluid in the interior of the chamber C is similarly subject to centrifugal force and is made to flow outwardly through the web 10, thereby further dislodging retained particles. It thus back-flushes the web 10. This means that the web 10 is subjected to a mechanical force as well as back-flushing.

As a result of the centrifugal force developing upon rotation of the filter unit 2 about its upright axis, the closure elements 16 and 17 are pivoted radially outwardly against the biasing force of the springs 18 and 19, until they gas-tightly close the openings 14 and 15 and prevent further communication of the conduit means 3 with the interior of the chamber C. At the same time the opening 20 is unblocked, permitting the inflow of additional back-flushing air into the chamber C. If desired, the aforementioned fan may be provided to forcibly supply such back-flushing air. In any case, a rapid and thorough removal of particles from the material of the filter web 10 takes place.

When subsequently the rotation of the filter unit 2 is terminated, by switching off the rotating means 21, the centrifugal force decreases and disappears, and the springs 18 and 19 urge the elements 16 and 17 back to the open position shown in FIG. 3. Now, the flow of filtered air from the chamber C into the conduit means 3 can resume.

It will be appreciated that the present invention thus makes possible the regeneration of the filter material web 10 without having to shut off either the incoming particle-carrying gaseous fluid or the suction means which communicates with the conduit means 3, permitting a rapid regeneration without having to interfere with the operation of any of the other components of a system in conjunction with which the scrubber is used. This makes it possible, in particular, to combine any desired number of scrubbers according to the present invention into a high-capacity installation of great effectiveness.

The illustrated embodiment is, of course, only exemplary. It is clearly possible to utilize different closure means for interrupting communication between the chamber C and the conduit means 3 while the filter web 10 is being regenerated, without in any way departing from the concept of the invention. Also, other geometric configurations can be chosen for the cross-section of the chamber C, although the star-shaped configuration is thought to be the optimum from the point of view of providing the largest possible surface area in the smallest possible space. It is important that whatever modification may be made within the concept and intent of the present invention, there be provided not only a large filter material surface area, but an optimum effect of the centrifugal force upon the retained particles, not only in terms of mechanically flinging them off the outer side of the web 10, but also in terms of producing the interior of the chamber C a substantial air flow in radially outward direction to back flush the web 10. It will also be appreciated that the fan which can be utilized to introduce back flushing air into the opening 20, could be omitted, in which case reliance for the inflow of back flushing air would be placed upon the suction created by the centrifugal ejection of air in outward direction from the chamber C through the web 10.

It will be understood that each of the elements described above, or two or more together, may also find a useful application in other types of constructions differing from the types described above.

While the invention has been illustrated and described as embodied in a scrubber for removing particulate matter from gaseous fluid, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be protected by letters Patent is set forth in the appended

I claim:

1. In a scrubber for removing particulate matter from gaseous fluid, in combination, a filter unit interposed in the flow of a stream of particle-carrying gaseous fluid and mounted for rotation about an upright axis, said filter unit comprising a pair of vertically spaced plates, a plurality of connecting elements connecting said plates, and a web of filter material trained about said connecting elements and surrounding said axis so as to define an interior chamber into which filtered gaseous fluid enters while particles are retained at the exterior side of said web; conduit means communicating with a source of suction and normally communicating with said interior chamber for withdrawing filtered gaseous fluid from the latter; rotating means for rotating said filter unit about said axis to thereby effect centrifugal ejection of retained particles from said web; and control means for interrupting communication between the entire interior of said interior chamber and said conduit means in automatic response to rotation of said filter unit about said axis.

2. In a scrubber as defined in claim 1, wherein said connecting elements are so arranged as to support said web trained thereabout in a substantially star-shaped configuration.

3. In a scrubber as defined in claim 1, at least one of said plates having an aperture which communicates with said interior chamber; and wherein said conduit means communicates with said aperture.

4. In a scrubber as defined in claim 3, said filter unit further comprising a tubular conduit section provided on said one plate and communicating with said aperture, said conduit section having at least one opening which communicates with said conduit means.

5. In a scrubber as defined in claim 3, said filter unit further comprising a tubular conduit section provided on said one plate and communicating with said aperture, said conduit section having two openings which communicate with said conduit means; and wherein said control means comprises a pair of segmental closure elements each dimensioned to close one of said openings, pivot means mounting said closure elements in said tubular conduit section for movement between an open and a closed position, and biasing means normally biasing said closure elements to said open position but only with such force that said closure elements can move to said closed position in response to the development of centrifugal force upon rotation of said filter unit about said axis.

6. In a scrubber as defined in claim 5, wherein said biasing means comprises helical springs each having opposite end portions which are respectively connected with said tubular conduit section and with one of said closure elements spaced from the pivot means associated with the latter.

7. In a scrubber as defined in claim 5, said conduit section further comprising a normally blocked inlet opening for admitting air into said interior chamber; and wherein said control means is operative for unblocking said inlet opening when said filter unit rotates about said axis.

8. In a scrubber as defined in claim 7, said control means effecting unblocking of said inlet opening in response to said closure elements reaching said closed position thereof.

9. In a scrubber as defined in claim 1, said connecting elements being substantially rod-shaped.

10. In a scrubber as defined in claim 9, wherein some of said connecting elements are located on an inner circle surrounding said axis, and others of said connecting elements are located on an outer circle surrounding said axis and said inner circle, said web of filter material being alternately trained about a connecting element of said inner circle and a connecting element of said outer circle so that said interior chamber is of substantially star-shaped configuration.

* * * * *